US012691861B2

(12) United States Patent
van Thiel

(10) Patent No.: US 12,691,861 B2
(45) Date of Patent: Jul. 28, 2026

(54) DIAGNOSTIC METHOD AND BRAKING SYSTEM INCLUDING A UNIT FOR PERFORMING THE DIAGNOSTIC METHOD

(71) Applicant: ZF CV Systems Global GmbH, Bern (CH)

(72) Inventor: Julian van Thiel, Grossburgwedel (DE)

(73) Assignee: ZF CV Systems Global GmbH, Bern (CH)

( * ) Notice: Subject to any disclaimer, the term of this patent is extended or adjusted under 35 U.S.C. 154(b) by 403 days.

(21) Appl. No.: 18/497,657

(22) Filed: Oct. 30, 2023

(65) Prior Publication Data

US 2024/0075918 A1 Mar. 7, 2024

Related U.S. Application Data

(63) Continuation-in-part of application No. PCT/EP2022/060565, filed on Apr. 21, 2022.

(30) Foreign Application Priority Data

Apr. 28, 2021 (DE) ..................... 10 2021 110 832.2

(51) Int. Cl.
| | |
|---|---|
| *B60T 17/22* | (2006.01) |
| *B60T 13/36* | (2006.01) |
| *B60T 13/68* | (2006.01) |

(52) U.S. Cl.
CPC .............. *B60T 17/22* (2013.01); *B60T 13/36* (2013.01); *B60T 13/683* (2013.01); *B60T 2270/402* (2013.01); *B60T 2270/88* (2013.01)

(58) Field of Classification Search
None
See application file for complete search history.

(56) References Cited

U.S. PATENT DOCUMENTS

| | | | |
|---|---|---|---|
| 5,681,992 A | 10/1997 | Klein et al. | |
| 6,719,376 B1 | 4/2004 | Klein et al. | |
| (Continued) | | | |

FOREIGN PATENT DOCUMENTS

| | | |
|---|---|---|
| CA | 2318002 A1 | 3/2001 |
| CA | 28697098 A1 * | 9/2013 |
| (Continued) | | |

OTHER PUBLICATIONS

CN 108883758 A: English Machine Translation (Year: 2018).*

(Continued)

*Primary Examiner* — Melanie Torres Williams

(74) *Attorney, Agent, or Firm* — Walter Ottesen, P.A.

(57) ABSTRACT

A diagnostic method performs a self-diagnosis of an electronically controllable pneumatic braking system for a commercial vehicle. The method includes: receiving a learning signal about the braking system; in response to the reception, putting the braking system into a learning mode and performing the steps: performing a predetermined first activity of the braking system with the commercial vehicle stationary or moving; detecting via a sensor arrangement a first learning system reaction of the braking system in response to the execution of the first activity; and storing the detected first learning system reaction as the first target system reaction in a memory. A braking system and a computer program are also disclosed.

19 Claims, 4 Drawing Sheets

(56) References Cited

U.S. PATENT DOCUMENTS

| | | | |
|---|---|---|---|
| 9,207,135 | B2 | 12/2015 | Staufer et al. |
| 2010/0010722 | A1 | 1/2010 | McLain et al. |
| 2019/0299962 | A1 | 10/2019 | Leiber et al. |
| 2020/0055511 | A1 | 2/2020 | Schwagmeyer et al. |
| 2020/0134939 | A1 | 4/2020 | Schell et al. |
| 2020/0331482 | A1 | 10/2020 | Schiemenz |
| 2021/0129813 | A1 | 5/2021 | Stahle |
| 2021/0155209 | A1 | 5/2021 | Dieckmann et al. |
| 2022/0048483 | A1 | 2/2022 | Stahle |

FOREIGN PATENT DOCUMENTS

| | | | | | |
|---|---|---|---|---|---|
| CN | 101624942 | A | | 1/2010 | |
| CN | 106828474 | A | | 6/2017 | |
| CN | 108883758 | A | * | 11/2018 | ............. B60T 8/327 |
| CN | 110520341 | A | | 11/2019 | |
| DE | 10 2013 007 857 | A1 | | 11/2014 | |
| DE | 10 2014 006 614 | A1 | | 11/2015 | |
| DE | 10 2017 003 782 | A1 | | 10/2018 | |
| DE | 10 2017 003 784 | A1 | | 10/2018 | |
| DE | 10 2017 207 476 | A1 | | 11/2018 | |
| DE | 10 2017 130 549 | A1 | | 6/2019 | |
| DE | 10 2018 222 677 | A1 | | 6/2020 | |
| DE | 10 2020 211 838 | A1 | | 5/2021 | |
| EP | 0 733 531 | A2 | | 9/1996 | |
| EP | 0 733 532 | A2 | | 9/1996 | |
| EP | 1 352 798 | A1 | | 10/2003 | |

OTHER PUBLICATIONS

CN 110520341 A: English Machine Translation (Year: 2019).*

English translation and Written Opinion of the International Searching Authority dated Sep. 14, 2022 for international application PCT/EP2022/060565 on which this application is based.

International Search Report of the European Patent Office dated Sep. 14, 2022 for international application PCT/EP2022/060565 on which this application is based.

English translation and Office action of the Chinese Patent Office dated Mar. 28, 2026 in corresponding Chinese patent application 202280031311.7.

* cited by examiner

DIAGNOSTIC METHOD AND BRAKING SYSTEM INCLUDING A UNIT FOR PERFORMING THE DIAGNOSTIC METHOD

CROSS-REFERENCE TO RELATED APPLICATIONS

This application is a continuation-in-part application of international patent application PCT/EP2022/060565, filed Apr. 21, 2022, designating the United States and claiming priority from German application 10 2021 110 832.2, filed Apr. 28, 2021, and the entire content of both applications is incorporated herein by reference.

TECHNICAL FIELD

The disclosure relates to a diagnostic method for performing a self-diagnosis of an electronically controllable pneumatic braking system for a commercial vehicle. The disclosure further relates to an electronically controllable pneumatic braking system for a commercial vehicle and a computer program.

BACKGROUND

A diagnostic method of the type mentioned at the beginning is preferably used for electronically controllable pneumatic braking systems of partially or fully autonomous commercial vehicles. Especially for degrees of automation according to SAE levels 2 to 5, especially 4 and 5, such a diagnostic method is useful and preferred for carrying out self-diagnosis. Today's braking systems rely on the driver's diagnostic capability and error response for various faults that occur very rarely in their frequency. Mechanical or pneumatic faults are particularly affected, for the effect on the system of which there may not be another direct sensor downstream for fault detection. However, if no driver is provided for in a partially or fully autonomous vehicle, further means are needed to detect such faults.

From DE 10 2018 222 677 A1 a method is known which can be used in the so-called platooning of commercial vehicles. The method concerns the operation of a vehicle that is set up to drive autonomously at least temporarily, wherein it is determined whether one or more switching conditions are met while the vehicle is operating in a first driving mode in which the vehicle is driving autonomously. In the event that such a switching condition is met, the vehicle is switched to a second driving mode in which the vehicle is being piloted. In particular, switching conditions can be a difficult route, a construction site or other situations that are difficult to master autonomously. In this case, the second driving mode in which the vehicle is being piloted, for example by the car ahead, is then switched on.

DE 10 2017 130 549 A1 describes a method for self-diagnosis. This document assumes that diagnostic methods for detecting fault conditions are known, but in which the vehicle must drive while maintaining certain boundary conditions in order to collect diagnostic data. This is considered a disadvantage, since it is necessary to intervene in the standard mode of operation, and restrictions are imposed on the driver in the process. In DE 10 2017 130 549 A1, an attempt is made to solve this by providing a separate diagnostic operating mode in which the self-diagnosis is then carried out. As a result, for example, a certain mode desired by the driver is not disturbed by an interruption due to the diagnostics.

In addition, DE 10 2013 007 857 A1 discloses a method for operating a braking system in a motor vehicle equipped with a driver assistance system configured for fully automatic, independent vehicle guidance. The idea described here is to achieve fail-safe status. Here, an action plan is determined, which should be used if a fault occurs. The action plan will be determined and constantly updated depending on operating parameters, including at least one ego parameter describing the current operating state of the motor vehicle and/or at least one environmental parameter describing the environment of the motor vehicle. The basic idea of DE 10 2013 007 857 A1 is therefore to define a safe condition, for example where the motor vehicle is at a standstill in the currently used lane or an adjacent lane, for example a hard shoulder. On the basis of the current operating condition of the motor vehicle, as described by the operating parameters, it is therefore possible to identify an action plan containing braking measures to bring about this safe condition. This means that a brake profile is generated as an action plan when driving in a fault mode and is kept up to date at all times, wherein the action plan is then applied in the event of a fault. Thus, the teaching of DE 10 2013 007 857 A1 does not start with fault detection, but with a condition when a fault has already occurred and the vehicle is to be transferred to a safe condition. Proactive detection of faults and correction of these faults will not be discussed further here.

From DE 10 2017 207 476 A1 a method for monitoring a friction brake is known. For this purpose, the braking system is activated briefly by test braking when the vehicle is in a known driving condition. By evaluating acceleration values, it is then possible to draw conclusions about the condition of the friction brake. For this purpose, determined acceleration values are compared with known values of the braked vehicle. However, it is not disclosed how such values are determined, how they are to be provided, stored or used, nor how the comparison is carried out in detail.

Similar methods for performing a test braking are known from EP 0 733 531 B1 and EP 0 733 532 B1. The former discloses a test braking for the determination and adjustment of the distribution of braking energy to the brakes according to the response energy. The latter discloses a method for simplifying the determination of the response pressure of the brakes of a vehicle. In the first version, test braking with low brake pressure is provided, wherein the brake pressure is varied until there is a change in the vehicle deceleration. In the second version, it is provided that, after service braking, the brake pressure of the brake to be examined is maintained with varying brake pressure until this causes a change in the vehicle deceleration.

In addition to the systems described above, which enable fail-safe operation, piloted operation or the like, or which can determine a status of the braking system, such as the state of a friction brake, there is still a need to provide a method, a braking system and a computer program of the type mentioned above that enable fault detection in a simple and safe manner. In particular, such a method should also be able to take into account manufacturing, assembly or age-related variances in the braking system. It has been shown, for example, that rigid limit values that are specified during development are not always suitable for serving as limit values for faults in the braking system. Depending on the assembly, manufacturing tolerances or wear, braking system reactions may vary slightly, even if they are still within permissible tolerances. In addition, faults should also be detected that cannot be detected directly by a sensor or can be determined by a function test.

SUMMARY

The disclosure solves the problem with a diagnostic method of the type mentioned heretofore, with the steps: receiving a learning signal at the braking system; in response to receiving the learning signal: putting the braking system into a learning mode and performing the steps: performing a predetermined first activity of the braking system when the commercial vehicle is stationary or moving; detecting via a sensor arrangement a first learning system reaction of the braking system and a response to the execution of the first activity; and storage of the recorded first learning system reaction as the first target system reaction in a memory unit.

The disclosure makes use of the knowledge that a system reaction in a defined state in response to a defined reaction can be detected and stored in order to then serve as a reference for a subsequent test. As a result, the diagnostic method is not limited to the immediate provision of a sensor for a module, function or subsystem under test, but the verification can be carried out on the basis of the system reaction. When capturing and storing a system reaction that occurs in response to the execution of a predetermined first activity, system-immanent properties are also taken into account. For example, every pneumatic braking system has certain leaks that do not negatively affect the function but can affect the system reaction in certain areas. Such leaks, which cannot be completely avoided during the installation of the braking system, are intrinsically taken into account in the diagnostic method according to the present disclosure.

The learning mode is preferably switched on only when the commercial vehicle is in a defined state, preferably a fault-free state. For example, the learning signal can be provided following a factory acceptance, a repair of the commercial vehicle, maintenance or the like. It may be provided that the learning signal can be provided by the driver of the commercial vehicle, for example by pressing a switch, or received wirelessly via a remote transmitter. It may also be provided that the learning signal may only be provided by the manufacturer of the commercial vehicle. In a further variant, it may be provided that the learning signal is triggered and/or made available periodically, as part of a pre-departure check, or due to a routine in a higher-level control unit, for example a control unit for autonomous driving of the commercial vehicle.

The sensor arrangement used to detect the first learning system reaction of the braking system in response to the performance of the first activity is preferably a sensor arrangement that is already present in the braking system, such as, in particular, sensors installed and present in the braking system, in particular pressure sensors, wheel revolution rate sensors, wear sensors and the like.

The first activity can be an activity that is carried out while the commercial vehicle is stationary or an activity that is carried out while the commercial vehicle is moving. Activities carried out while the vehicle is moving include, in particular, activities carried out at a very low speed or a low speed. Typically, activities with a stationary vehicle are sufficient for detecting most faults. Such activities can be used, for example, to detect leaks in hoses. Activities that must be carried out while the vehicle is moving are, in particular, those that must detect a deceleration of the vehicle in order to detect a fault. As long as wheel revolution rates are not important for detecting a fault, an activity that can and should be carried out while the vehicle is stationary is usually sufficient, which can increase safety.

According to a first embodiment of the diagnostic method, it includes the steps: performing a first system diagnosis with the steps: performing the predetermined first activity of the braking system when the vehicle is stationary or moving; detecting via the sensor arrangement a first diagnostic system reaction of the braking system in response to the execution of the first activity; comparing the first diagnostic system reaction in a comparator unit with the previously stored first target system reaction; and in the event of a deviation between the first target system reaction and the first diagnostic system reaction: outputting a first fault signal. Thus, to diagnose the braking system, the same first activity is carried out that was carried out when the learning system reaction was detected. In this way, a deviation between the learning system reaction and the actual system reaction can be determined. Preferably, limit values are specified for the learning system reaction that corresponds to the target system reaction. These limit values can be set and applied automatically by the braking system, the comparator unit or the like. The limit values can be applied depending on one or more parameters.

In this way, it is possible to compare a learned system behavior with an actually occurring system behavior and, based on this comparison, to detect whether there is a fault in the braking system.

In an embodiment, the outputting of the first fault signal includes: at least partially preventing an automated mode of the commercial vehicle. According to this embodiment, it may be provided, for example, that in order to authorize the at least partial, preferably complete, automated mode of the commercial vehicle, it is first necessary to carry out the diagnostic method, or at least steps thereof. For example, before activating the automated mode of the commercial vehicle, the comparison between the target system reaction and the diagnostic system reaction can be performed. If no fault signal is output, the automated mode of the commercial vehicle can be carried out, but if the fault signal is output, the execution of the automated mode, partial or complete automated mode, is at least partially or completely prevented. In this state, it may then be provided that the commercial vehicle can only be controlled by the driver himself, possibly using a limited automated mode in which certain systems or subsystems can still be used. This means that even if the fault occurs, it is not absolutely necessary for the vehicle to come to a standstill immediately or to transfer the vehicle to a safe state. Rather, it may be provided that the commercial vehicle can still be operated, but no longer fully automated. In this case, the fault signal is preferably output via a vehicle BUS and, in particular, to an autonomous driving unit that is preferably superior to the braking system.

In a further embodiment of the diagnostic method, it may be provided that the predetermined first activity concerns only a first subsystem of the braking system. In this case, based on the first activity, it is possible to test the first subsystem and diagnose a fault in the first subsystem. For other subsystems, it is preferable to carry out further activities. This also allows for a selective or limited test related to the subsystem(s) to be diagnosed. This is particularly advantageous if, for example, only one or more of a large number of subsystems has been maintained, or only this is necessary for the automated mode and is thus to be subjected to diagnostics.

Preferably, the diagnostic method also includes the following steps in the learning mode: performing a predetermined second activity of the braking system when the commercial vehicle is stationary or moving; detecting via another sensor arrangement or the sensor arrangement a second learning system reaction of the braking system in response to the execution of the second activity; and storing the detected second learning system reaction as a second target system reaction in another memory unit or the memory unit. The predetermined second activity may relate to another subsystem of the braking system or may concern another aspect of the braking system. However, it can also refer to the same subsystem as the first activity but affect a different functionality. It should be understood that third, fourth, fifth, et cetera, activities can also be carried out in order to diagnose the braking system as completely as possible. In a corresponding way, third, fourth, fifth, et cetera, learning system reactions are then also stored as third, fourth, fifth, et cetera, target system reactions. Preferably, all target system reactions are stored in the same memory unit.

The sensor arrangement may differ depending on the activity. For example, a first activity could be to control a brake pressure on a front axle, while a second activity is to control a brake pressure on a rear axle. In this respect, a sensor arrangement to detect the first learning system reaction would include sensors on the front axle, while a sensor arrangement to determine the second learning system reaction would have to include sensors on the rear axle. It may also be provided that all reactions of sensors of a braking system are recorded, regardless of the type of activity. In this way, a complete picture of the entire braking system can be obtained. In order to reduce the memory and computing requirements, however, it is preferable to activate only those sensors that are typically related to the system reaction as part of the detection of learning system reactions.

In the event that a second activity is carried out in the learning mode, the method preferably also includes: performing a second system diagnosis with the following steps: performing the predetermined second activity of the braking system when the vehicle is stationary or moving: detecting a second diagnostic system reaction of the braking system in response to the execution of the second activity via the further sensor arrangement; comparing the second diagnostic system reaction in another comparator unit or the comparator unit with the previously stored second target system reaction; and if there is a deviation between the second target system reaction and the detected second diagnostic system reaction: outputting a second fault signal.

With regard to the execution of the comparison as well as the fault signal and also the sensor arrangement, what has already been disclosed above for the first system diagnosis applies. However, it may also be provided that the second fault signal has a different consequence than the first fault signal. This can depend in particular on which system or subsystem of the braking system is addressed via the first or second activity. If, for example, the systems are function-critical or safety-related, outputting a fault signal should also result in the prevention of further operation of the commercial vehicle. In the case of systems that only restrict autonomous operation, the fault signal should entail the prevention of the autonomous mode. In other cases, for example if comfort systems do not work or do not function properly, it may be provided that the commercial vehicle can still be operated or may be operated with certain restrictions.

According to another embodiment, it is provided that the step of comparison in the comparator unit is carried out taking into account at least one parameter selected from: the ambient temperature, the supply pressure, in particular the static supply pressure before the start of the diagnostic method or the dynamic supply pressure profile during the diagnostic method, the electrical supply voltage level in the braking system or one or more parts thereof, the electrical power consumption in the braking system or one or more parts thereof.

The parameters can influence how the system reaction turns out in detail. For example, with a lower supply pressure, a lower brake pressure is to be expected, as this depends on the supply pressure. Therefore, a lower brake pressure does not necessarily indicate a leakage of a line between an axle modulator and a brake actuator but can also be due to a slightly lower supply pressure. By taking into account one or more of the parameters mentioned, the reliability and robustness of the fault detection can be improved. Preferably, the parameters are also recorded and stored when determining the target system reaction. Preferably, the parameters are detected and stored when determining the diagnostic system reaction. The comparator unit may have algorithms that implement the consideration of the parameter(s) when comparing. Alternatively, the diagnostic system reaction is made available in a normalized and/or parameter-compensated form and preferably stored, preferably at least in the comparator unit. One or more of the above parameters can be used here. It can also be determined that one or more of the parameters are not within a reasonable range to carry out the method. If, for example, one or more of the parameters is outside a range of about 20% below or above the target value, it may not make sense to carry out the diagnostic method. In this case, it can be canceled, repeated or scheduled at a later time.

Preferably, the predetermined first activity is a step signal to a brake force modulator. Such an activity is a well-defined operation. For example, a brake signal that requires a maximum braking force is modulated for a short time, preferably for a period of less than 1 second, preferably for a period of several milliseconds. This can apply wheel-by-wheel, axle-by-axle, or to the entire braking system. Other predetermined first activities may also include actuating certain, possibly individual, electromagnetic valves, such as an ABS valve, activating parking brakes, activating an air suspension system, a compressor, a trailer control valve, electric steering, and the like. Activities that can be carried out while the vehicle is moving are, in particular, the application of a friction brake in order to detect a condition of the brake. The diagnostic system reaction in this case is a vehicle deceleration. This can be used, for example, to detect a glazed or worn brake pad.

Preferably, the sensor arrangement contains at least one pressure sensor. The pressure sensor is preferably a pressure sensor provided in a modulator of the braking system. In this respect, the diagnostic method can use systems and subsystems that are already present in conventional braking systems.

In addition or alternatively, the sensor arrangement may include a measuring unit for detecting a volume flow or a mass flow and/or a noise sensor. A measuring unit for detecting a volume flow or a mass flow is preferred in order to determine the mass flow or the volume flow of compressed air at a specific point in the system. For example, there are cases in which there is a leak despite a constant pressure, but the escaping compressed air is additionally supplied from the supply and/or by the compressor. In this case, there is a volume flow of compressed air, but a pressure sensor does not detect a pressure drop. By providing a measuring unit to record a volume flow or a mass flow, such a leak can also be detected. An additional noise sensor can only improve the measurement result. If there is a leak, this is usually also associated with an acoustic noise. Typically, such a leak is detected by a driver of the commercial vehicle as part of a departure check. The driver walks around the commercial vehicle and, based on his experience, he recognizes when there is a leak. In the case of purely autonomous vehicles, it is preferable to carry out such a test automatically. For this purpose, the noise sensor is used. Multiple noise sensors can also be placed at different positions in the braking system.

In addition or alternatively, the sensor arrangement may contain an olfactory sensing unit (odor sensor) and/or a gas sensor for detecting an aromatic substance, messenger substance and/or gas. In this way, a leak in the braking system can also be detected. For this purpose, a specific olfactory substance, messenger substance or a specific gas preferably not occurring in nature and/or in the vehicle may be added to the compressed air. This may be done only for the purposes of the diagnostic method or permanently. The odor sensor or gas sensor then provides a corresponding signal, which in turn can be further evaluated and/or processed as part of the diagnostic method.

In the event that the first activity involves the application of one or more friction brakes, a deceleration sensor is preferably also used as part of the sensor unit to determine a deceleration of the commercial vehicle. Such a deceleration sensor can be in the form, for example, of a control sensor or gyroscope and is used to detect the vehicle deceleration caused. Preferably, other parameters are taken into account, such as in particular the load of the vehicle, the type of tires, road conditions and the like. Alternatively or additionally, the deceleration can also be detected by way of wheel revolution rate sensors, as is known in principle in the prior art.

It is preferably also provided that the first fault signal or the second fault signal and possibly further fault signals is/are output to a safety driver, an external operator and/or a higher-level automation system. A safety driver can then intervene in response to the reception of the fault signal and take over driving the commercial vehicle, at least in part, for example. The safety driver could possibly also rectify the fault and thus also re-enable complete autonomous operation of the vehicle. An external operator may be informed about there being a fault in the commercial vehicle and may likewise intervene as appropriate, be it via remote assistance or directly. A higher-level automation system, for example a unit for autonomously driving the commercial vehicle, may take the fault signal as a basis for determining whether autonomous operation is still possible or which subsystems might not be able to be operated or might be able to be operated only with restrictions.

In a further embodiment, it may be provided that the method includes: in response to the first fault signal and/or the second fault signal a driver of the commercial vehicle is asked to enable an automated mode of the commercial vehicle. The fault signal is displayed to the driver and the driver can then himself decide whether or not autonomous operation of the vehicle should be enabled. Only if the driver confirms this can the commercial vehicle continue to be operated in an automated manner.

In a second aspect, the disclosure solves the problem by way of an electronically controllable pneumatic braking system for a commercial vehicle, with a first brake circuit supplied by a first compressed air supply, a second brake circuit supplied by a second compressed air supply, at least one front axle brake pressure valve for controlling a front axle brake pressure on a front axle of the commercial vehicle; at least one rear axle brake pressure valve for controlling a rear axle brake pressure on at least one rear axle of the commercial vehicle, a central control unit for controlling the braking system, and a diagnostic control unit which is suitable for carrying out the diagnostic method according to one of the embodiments of the diagnostic method according to the first aspect of the disclosure that have been described above.

The first brake circuit may be provided for a rear axle and the second brake circuit may be provided for a front axle, for example. The brake circuits may also be provided for the commercial vehicle according to the sides or crosswise. Besides the first and second brake circuits, further brake circuits may also be provided, such as in particular a parking brake circuit or a separate brake circuit for any trailer that is provided. The braking system may furthermore be provided with redundant functions, such as in particular so-called fail-operational functions, which allow the braking system to be operated at least in part even if there is a fault. For this purpose, the braking system preferably has a vehicle BUS, via which the braking system is connected to a unit for autonomous driving, an electronic steering and other systems. The braking system is preferably supplied with power by two independent voltage sources.

In one variant, the diagnostic control unit may be part of the central control unit or may be integrated with it to form a module. By way of example, the diagnostic control unit is provided on a circuit board with the central control unit. It may also just be in the form of a separate element that is integrated in a module with the central control unit. Additionally or alternatively, however, the central control unit may also be integrated with one of the front axle and/or rear axle brake pressure valves so as to form a module.

In one variant, the diagnostic control unit is in the form of a stand-alone module having a voltage connection and a connection for a BUS system of the commercial vehicle. The voltage connection of the diagnostic control unit is preferably connected to a voltage source that also supplies the central control unit with voltage and/or to an independent voltage source separate therefrom. There may also be provision for the voltage connection of the diagnostic control unit to be connected to a voltage output of the central control unit, with the result that the central control unit supplies the diagnostic control unit with voltage.

Furthermore, it may be provided that the diagnostic control unit is connected to a further state monitoring unit of the braking system that, besides the steps for the diagnostic method described above, also performs further verification and diagnosis steps for other systems of the braking system and/or of the commercial vehicle.

In a further aspect, the problem cited at the outset is solved by a computer program containing commands that cause the braking system according to the second aspect of the disclosure to carry out the method steps according to the diagnostic method according to the first aspect of the disclosure. Such a computer program may be provided in particular on a data memory or as a download, or may be supplied stored on a circuit board as a module for a braking system.

BRIEF DESCRIPTION OF DRAWINGS

The invention will now be described with reference to the drawings wherein.

DETAILED DESCRIPTION

Figure 1:
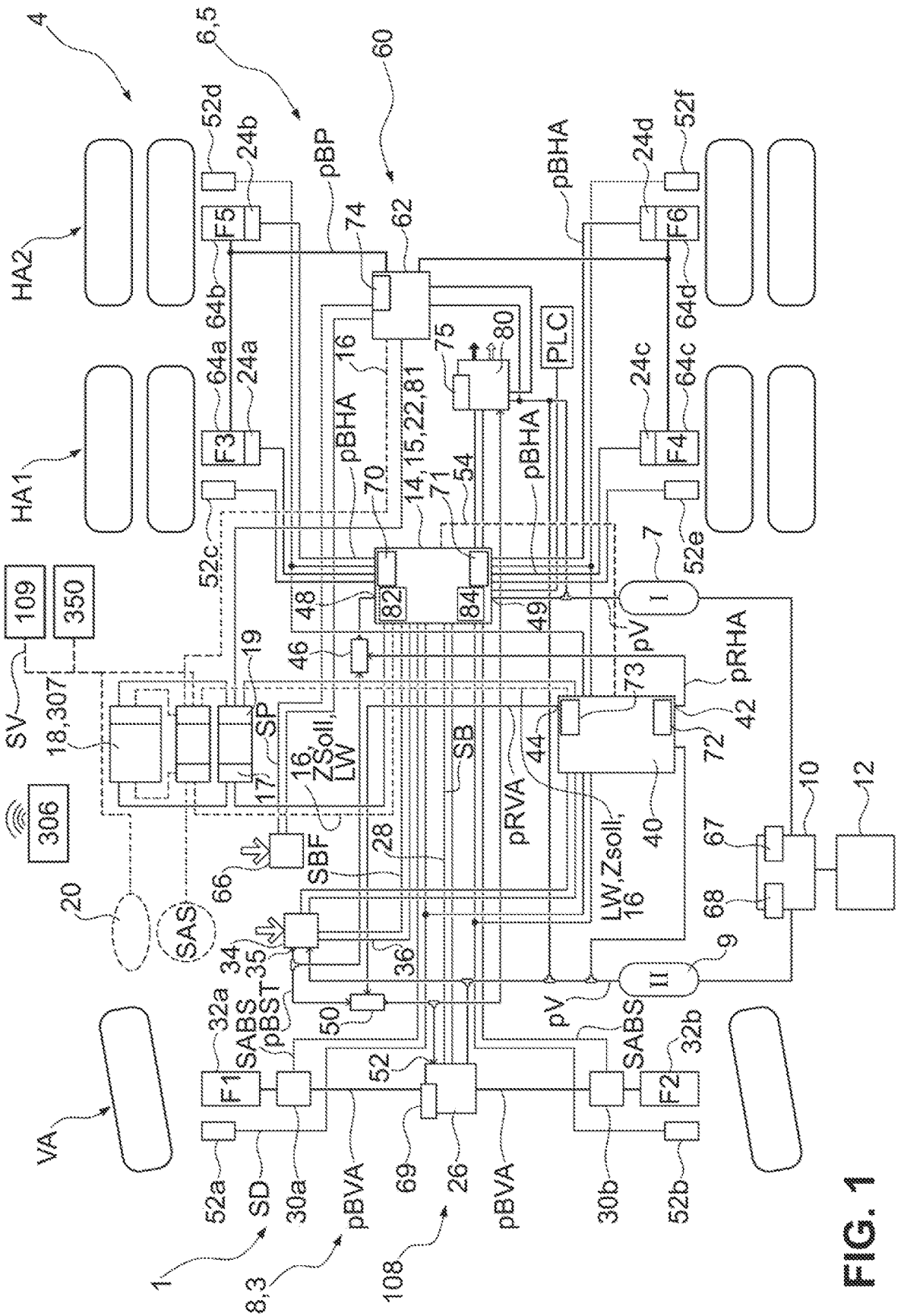
FIG. 1 shows a schematic representation of an electronically controllable pneumatic braking system according to a first embodiment.

First of all, FIG. 1 is used to illustrate an electronically controllable pneumatic braking system 1 in which a diagnostic method (see FIG. 2) 2 according to one aspect of the disclosure is carried out.

The electronically controllable pneumatic braking system 1 is provided in a commercial vehicle 4 that, here, includes a front axle VA, a first rear axle HA1 and a second rear axle HA2. However, it may just as well be provided for commercial vehicles that have only one rear axle or more than three axles, in particular one or more additional axles, lift axles or the like.

The braking system 1 has a first brake circuit 6, which is in the form of a rear axle brake circuit here. The braking system 1 moreover has a second brake circuit 8, which is in the form of a front axle brake circuit. The first brake circuit 6 is supplied via a first compressed air supply 7; the second brake circuit 8 is accordingly supplied via a second compressed air supply 9. The first and second compressed air supplies 7, 9 are connected to an air treatment unit 10, which for its part is connected to a compressor 12. The air treatment unit 10 is used to fill the first and second compressed air supplies 7, 9 with air in order to accordingly provide a supply pressure pV for the first and second brake circuits 6, 8.

A central control unit 14, which acts as a primary central control unit here, is provided to control the braking system 1. The central control unit 14 is connected to an autonomous driving unit 18 via a vehicle BUS 16 and receives brake request signals ZSoll from the autonomous driving unit. For this purpose, the central control unit 14 has a first BUS connection. The central control unit 14 can also use the vehicle BUS 16 to receive steering angle signals LW provided by an active steering 20.

In the embodiment shown here (FIG. 1), the central control unit 14 is in the form of a combined central module 15 and, besides a circuit board, also includes a rear axle modulator 22 in the form of one or more electromagnetically switchable valves (not shown in detail in FIG. 1). The exact configuration of such a rear axle modulator 22 is known to those skilled in the art. It typically includes at least one relay valve and two or more electromagnetic valves connected upstream of the relay valve, in order to provide the latter with a control pressure. In this respect, the embodiment shown here also has provision for the central control unit 14 to be connected to the first compressed air supply 7 and to receive supply pressure pV therefrom. On the basis of the signals received via the vehicle BUS 16, the central control unit 14 then switches one or more electromagnetic valves of the rear axle brake pressure valve 22, with the result that a rear axle brake pressure pBHA is then provided in appropriate brake pressure lines to rear axle brake pressure actuators 24a, 24b, 24c, 24d on the first and second rear axles HA1, HA2.

On the front axle VA there is accordingly provided a front axle brake pressure valve 26, which can be in the form of a conventional front axle brake pressure modulator, in particular a single-channel modulator, and is well known to those skilled in the art. The front axle brake pressure valve 26 is connected to the central control unit 14 via a first brake signal line 28 and receives brake signals SB from the central control unit that cause one or more electromagnetic valves of the front axle brake pressure valve 26 to be switched. In the embodiment shown here (FIG. 1), there is thus provision for direct wiring of the electromagnetic valves of the front axle brake pressure valve 26, wherein output stages can also be integrated in the latter. Alternatively, the front axle brake pressure valve 26 can also be configured to have its own intelligence. In this case, the front axle brake pressure valve 26 would then be advantageously connected to the central control unit 14 via a BUS line.

The front axle brake pressure valve 26 is connected to the second compressed air supply 9 and receives supply pressure pV from it. In response to the reception of the brake signal SB, the front axle brake pressure valve 26 modulates a front axle brake pressure pBVA using first and second ABS valves 30a, 30b on the first and second front axle brake actuators 32a, 32b.

Besides such automated modulation of front axle brake pressures pBVA and rear axle brake pressures pBHA prompted by the autonomous driving unit 18, manual control is also possible. For this purpose, the braking system 1 includes a brake encoder 34 in the form of a foot brake valve, which has a pneumatic output and two electrical outputs and is therefore in the form of a P2E foot brake valve. To this end, the brake encoder 34 receives supply pressure pV from the second compressed air supply 9. A first brake encoder line 36 is connected to the central control unit 14 and provides foot brake signals SBF on the latter. The brake encoder 34 is also supplied with voltage by the central control unit 14. Repeatedly operating the brake encoder 34 allows the foot brake signal SBF to be provided, which is then processed by the central control unit 14 in order to first modulate the rear axle brake pressure pBHA and then, as described above, to accordingly provide the brake signal SB on the front axle brake pressure valve 26, with the result that the front axle brake pressure pBVA is modulated.

If the electronic control unit 14 does not work or does not work correctly, a secondary central control unit 40 is provided in the braking system 1 shown here. The secondary central control unit 40 can perform the same functions as the central control unit 14 (primary central control unit) and is likewise connected to the autonomous driving unit 18 via the vehicle BUS 16, but via a second channel, and likewise receives steering angle signals LW and brake request signals ZSoll from the autonomous driving unit. It is moreover connected to a second voltage source 19, which is independent of the first voltage source 17, via which the primary central control unit 14 is supplied with power.

The secondary central control unit 40 is connected to the second compressed air supply 9 and receives supply pressure pV therefrom. In contrast to the primary central control unit 14, the secondary central control unit 40 does not directly control front axle brake actuators 32a, 32b or rear axle brake actuators 24a-24d. Instead, the secondary central control unit 40 has a rear axle redundancy pressure output 42 and a front axle redundancy pressure output 44, via which redundant control pressures for the rear axles HA1, HA2 and the front axle VA are output. A rear axle redundancy pressure pRHA, which can be provided at a redundancy pressure connection 48 of the primary central control unit 14 via a first shuttle valve 46 in the embodiment shown here, is provided at the rear axle redundancy pressure output. The redundancy pressure connection 48 is wired up internally in such a way that the rear axle brake pressure pBHA can be controlled even when the primary central control unit 14 is deenergized. By way of example, the rear axle redundancy pressure pRHA provided at the redundancy pressure connection 48 acts on a control piston of a relay valve, the supply connection of which is connected to a supply connection 49 of the central control unit 14 at which the supply pressure pV is provided by the first compressed air supply 7. Accordingly, the front axle redundancy pressure pRVA provided at the front axle redundancy pressure output 44 is provided at a redundancy pressure connection 52 of the front axle brake pressure valve 26 via a second shuttle valve 50. Here, there may likewise be provision for the front axle redundancy pressure provided at the redundancy pressure connection 52 to weigh directly on a control piston of a relay valve provided in the front axle brake pressure valve 26. In this way, the front axle brake pressure valve 26 is not reliant on brake signals SB being provided by the primary central control unit 14. Rather, the front axle brake pressure valve 26 can be operated purely pneumatically on the basis of the front axle redundancy pressure pRVA, which is controlled by the secondary central control unit 40.

In this way, a first redundancy level for the braking system 1 is withdrawn if the primary central control unit 14 is not working or not working correctly, or for example the first voltage source 17, via which the primary central control unit 14 is supplied with power, has failed.

Both the primary central control unit 14 and the secondary central control unit 40 are connected to wheel revolution rate sensors 52a-52f on wheels of the front axle VA and the two rear axles HA1, HA2 and receive speed signals SD from the wheel revolution rate sensors. In this way, both the primary central control unit 14 and the secondary central control unit 40 can perform slip-controlled or speed-controlled brake pressure modulation. Furthermore, both the primary central control unit 14 and the secondary central control unit 40 are connected to the ABS valves 30a, 30b in order to control them and to provide appropriate ABS signals SABS thereon. As such, an ABS functionality is also possible in the redundancy mode of the braking system 1. The primary central control unit 14 and the secondary central control unit 40 are connected to one another via a second BUS 54. This second BUS 54 can be used to exchange signals in order to also detect a timeout for one of the primary and secondary central control units 14, 40 on each side. This second BUS 54 is thus used by the central control units 14, 40 to monitor one another, and so they can alternately perform the function of the other if one of the two fails.

A purely pneumatic modulation of a brake pressure via the brake encoder 34 can also be implemented as a further redundancy level. The brake encoder 34 has a pneumatic brake encoder connection 35 that can be used to modulate a pneumatic brake encoder pressure pBST. The latter is provided both on the first shuttle valve 46 and on the second shuttle valve 50. The first and second shuttle valves 46, 50 are each in the form of Select High valves and each modulate the higher of the brake encoder pressure pBST and the front axle or rear axle redundancy pressure pRVA, pRHA. The functionalities in the primary central control unit 14 and the front axle brake pressure valve 26 are then identical. This allows a second fallback level in the braking system 1 to be withdrawn.

In the embodiment shown here, the braking system 1 includes a parking braking system 60 that includes a parking brake unit 62, also referred to as a parking brake module, and acts on parking brake actuators 64a-64d on the first and second rear axles HA1, HA2. Such a parking braking system 60 is typically supplied by a third compressed air supply, not shown here. The parking brake unit is connected firstly to the vehicle BUS 16 and secondly to the second voltage source 19, to which the secondary central control unit 40 is also connected. However, it can also be connected to the first voltage source 17, to which the primary central control unit 14 is connected, or may even be equipped with its own voltage source, or receive voltage from one of the further modules, such as in particular the (primary) central control unit 14 or the secondary central control unit 40. The parking brake unit 62 can receive signals to park the commercial vehicle 1 via the vehicle BUS 16. The vehicle BUS 16 can also be used to provide signals for additional braking, which means that the parking brake actuators 64a-64d are activated in addition to the rear axle brake actuators 24a-24d to decelerate the commercial vehicle 4.

To manually engage the parking brake, the braking system 1 includes a parking brake switch 66, which can be accommodated in the driver's cab of the commercial vehicle 4, for example. The parking brake switch can be used to provide parking brake signals SP on the parking brake unit 62 via an electrical line, with the result that the parking brake unit responds to the parking brake signal SP by activating the parking brake actuators 64a-64d.

Figure 2:
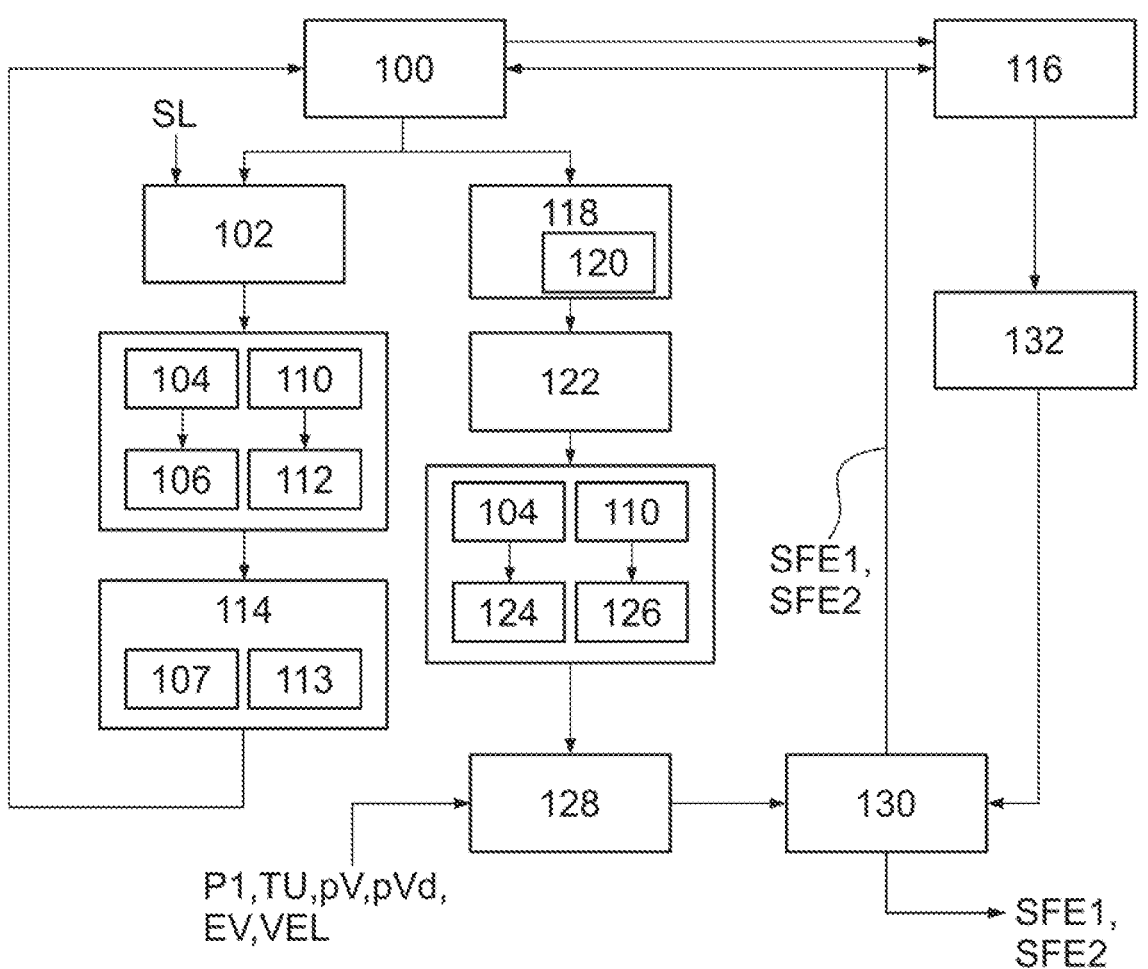
FIG. 2 shows a block diagram of a diagnostic method according to an embodiment.

As shown in FIG. 1, the braking system 1 is merely illustrative, but can be used for an autonomously driving commercial vehicle 4. According to the disclosure, the braking system 1 is configured to carry out a diagnostic method 2 for carrying out a self-diagnosis of the electronically controllable pneumatic braking system 1. An example of such a diagnostic method 2 is shown in FIG. 2 and will now be described with reference to FIG. 2 and FIG. 1.

When the commercial vehicle 4 is started, the system, in particular the braking system 1, is in the active mode (standby mode), but not in the autonomous mode. This is the case in block 100. In this state, neither an autonomous driving mode nor a learning mode, nor a system diagnosis of the commercial vehicle 4 or braking system 1, is active. Proceeding from here, there are three possibilities in the embodiment shown. First, there may be provision for a learning signal SL to be received and for a learning mode 102 to be activated in response thereto. This may be provided for and preferred, for example, when the commercial vehicle 4 is being checked in a final inspection or the learning signal is predefined manually by a driver, a service engineer or at the factory. The learning mode 102 should be activated and enabled only when the commercial vehicle 4 is in a defined state and it has previously been checked that it is working correctly. That is, there has previously preferably also been a manual check for whether there are leaks, sensors have failed or are operational or there are other malfunctions. This check can be performed manually, semi-manually or fully automatically. There may be provision for confirmation on the braking system 1 to be required first before the learning mode 102 can then be activated. If the learning mode 102 is activated, a next step includes carrying out a predetermined first activity 104 of the braking system 1. Such a first predetermined activity may be for example that the primary electronic control unit 14 prompts the front axle brake pressure valve 26 to modulate a maximum brake pressure on the first and second front axle brake actuators 32a, 32b for a predetermined period of, for example, 1 second. In this case, the first activity 104 would relate only to a first subsystem 3, here the second brake circuit 8. A learning system reaction 106 can then be recorded via a sensor arrangement 108 of the braking system in response to the performance of the first activity 104. The sensor arrangement 108 preferably includes a plurality, preferably all, of the sensors provided in the braking system 1. If the first predetermined activity, as described by way of illustration above, is the prompting of the front axle brake pressure valve 26 to modulate the front axle brake pressure pBVA by way of the central control unit 14, sensors are preferably evaluated as follows: the air treatment unit 10 includes a first pressure sensor 67 that detects the pressure provided to the first compressed air supply 7. The air treatment unit 10 includes a second pressure sensor 68 that measures the pressure of the compressed air provided to the second compressed air supply 9. Since the front axle VA in the embodiment shown here is supplied via the second compressed air supply 9, the second pressure sensor 68 is preferably taken into account in the present example. The front axle brake pressure valve 26 includes a third pressure sensor 69 that detects the front axle brake pressure pBVA provided. This third pressure sensor 69 is then preferably also taken into account for determining the learning system reaction 106. Preferably, it is not just the pressure currently present here and there that is measured, but rather in particular a pressure curve, that is, in particular the change in the modulated front axle brake pressure pBVA over time, when the modulation is instigated. There are always slight leaks in the braking system 1, and it is thus possible to record how the modulated front axle brake pressure pBVA changes over time when the braking system 1 is fault-free. The sensor arrangement 108 can also include a deceleration sensor 109 that provides a deceleration signal SV, in particular if the first predetermined activity 104 or any other activity is carried out when the commercial vehicle 4 is moving.

Another predetermined activity, for example a second predetermined activity 110, could be prompting the central control unit 14 to modulate the rear axle brake pressure pBHA for a predetermined period. In this case, the second activity 110 would then likewise relate only to a second subsystem 5, here the first brake circuit 6. For this purpose, the second learning system reaction 112 is then recorded by reading the first pressure sensor 67 described previously, which detects the pressure of the compressed air provided to the first compressed air supply 7, which supplies the rear axle brake circuit 6 with compressed air. Furthermore, the central control unit 14 has a fourth pressure sensor 70 and a fifth pressure sensor 71, the fourth pressure sensor 70 being provided for the right-hand vehicle side and the fifth pressure sensor 71 being provided for the left-hand vehicle side. Here too, it is again the case that preferably not just a present pressure but rather in particular a pressure curve is recorded. The system reaction recorded via these sensors is then recorded as a second learning system reaction 112.

In a moving commercial vehicle 4, the first predetermined activity 104 or else the second predetermined activity 110 or any other predetermined activity can include an actuation of one or more friction brakes 32a, 32b, 64a-64d via modulation of a brake pressure pBVA, pBHA on one or more axles VA, HA1, HA2 of the commercial vehicle 4 with a predetermined braking force F1, F2, F3, F4, F5, F6.

Besides the pressure sensors mentioned, the braking system 1 according to the first embodiment (FIG. 1) also includes a sixth pressure sensor 72 on the secondary central control unit 40, which detects the rear axle redundancy pressure pRHA, a seventh pressure sensor 73, which detects the front axle redundancy pressure pRVA, an eighth pressure sensor 74 on the parking brake unit 62, which detects a modulated parking brake pressure pBP, and a ninth pressure sensor 75, which is associated with a trailer control valve 80 and detects a modulated trailer brake pressure. If the first predetermined activity 104 or the second predetermined activity 110 are not performed while the commercial vehicle 4 is stationary, but rather when it is moving, some or all of the wheel revolution rate sensors 52a-52f are preferably also evaluated. In addition, further sensors, not shown here, may be provided, such as in particular acceleration sensors, yaw rate sensors and the like.

The recorded first learning system reaction 106 and the possibly recorded second learning system reaction 112 and also possibly further recorded learning system reactions are then stored in step 114. To this end, a memory unit 82 is preferably provided in the braking system 1, the memory unit being accommodated in the primary central control unit 14, preferably under the same circuit board, in the embodiment shown in FIG. 1. The first learning system reaction 106 is stored there as a first target system reaction 107 and the second learning system reaction 112 is stored there as a second target system reaction 113. After the storage, the system can return to the standby mode 100 again, as shown in FIG. 2. The vehicle driver or an autonomous unit 18 can then control the commercial vehicle 4 as usual. It is possible to switch to an autonomous mode 116, for example, in which the commercial vehicle 4 is controlled exclusively by the autonomous driving unit 18.

Proceeding from the standby mode 100, not only the learning mode 102 and the autonomous mode 116 but also a diagnostic mode 118 can be initiated, the diagnostic mode being initiated for example for a departure control 120 or when prompted by a specific signal, such as for example a signal predefined by a driver of the commercial vehicle 4 or a signal predefined by a service center. This may first include checking a state of subsystems in a health check 122, for example. This involves carrying out an internal onboard diagnosis, which checks in particular the response of specific sensors, the availability of modules and the like. If this has a positive outcome or no errors are detected, a first system diagnosis can be carried out. This includes performing at least the first predetermined activity 104 and possibly also the second predetermined activity 110 or other predetermined activities that have also been carried out for the learning mode 102. That is, if for example, the first predetermined activity in the learning mode was prompting the front axle brake pressure valve 26 to modulate the front axle brake pressure pBVA by way of the primary central control unit 14, this is also performed, in an identical way, for the system diagnoses. This then involves using the sensor arrangement 108 to determine and possibly store a first diagnostic system reaction 124 for the first predetermined action and a second diagnostic system reaction 126 for the second predetermined action 110 and other diagnostic system reactions for other predetermined actions in accordance with the first, second, et cetera, predetermined activities carried out.

A step of comparing 128 the first diagnostic system reaction 124 with the previously stored first target system reaction 107 is then performed in a comparator unit 84, which is likewise accommodated in the central control unit 14 in the embodiment shown in FIG. 1, and possibly also comparison 128 of the second diagnostic system reaction 126 with the previously stored second target system reaction 113 in the comparator unit 84. Both the comparator unit 84 and the memory unit 82 are part of a diagnostic control unit 81, which is likewise part of the central control unit 14 in the embodiment shown in FIG. 1, but may also be in the form of a separate module.

The comparison step 128 in the comparator unit 84 can be carried out taking into account at least one parameter P1 selected from: the ambient temperature TU, the supply pressure pV, in particular the static supply pressure pV1 before the start of the diagnostic method 2 or the dynamic supply pressure curve pVd during the diagnostic method 2, the electrical supply voltage level EV in the braking system 4 or one or more parts 3, 5, 6, 8 of this, the electrical power consumption VEL in the braking system 1 or one or more parts 3, 5, 6, 8 of this.

The parameters can influence how the system reaction 106, 112, 124, 126 turns out in detail. By way of example, with a lower supply pressure pV, a lower brake pressure pBVA, pBHA can also be expected, as the latter is dependent on the supply pressure pV. A lower brake pressure pBVA, pBHA therefore does not necessarily have to indicate a leak in a line between an axle modulator 26, 22 and a brake actuator 32a, 32b, 24a, 24b, 24c, 24d, but rather can also arise due to a somewhat lower supply pressure pV. By taking into account one or more of the parameters, it is thus possible to improve the reliability and robustness of the error detection. The parameters are preferably also recorded and stored when the first and second learning system reactions 106, 112 are determined. The parameters are preferably determined and stored when the diagnostic system reaction 124, 126 is determined. The comparator unit 84 can include algorithms that implement the consideration of the one or more parameters during the comparison. Alternatively, the diagnostic system reaction 124, 126 is made available in a normalized and/or parameter-compensated form and preferably stored, preferably at least in the comparator unit 84. This can involve using one or more of the aforementioned parameters. It is also possible to detect that one or more of the parameters are not in a useful range to carry out the diagnostic method 2. If for example one or more of the parameters are outside a range of approximately 20% below or above the nominal value, it may not be useful to carry out the diagnostic method 2. In this case, it can be terminated, repeated or carried out as planned at a later time.

A decision is then made in step 130 as regards whether a detected deviation A1, A2, A3 (cf. FIG. 5) is still within predetermined tolerance values, and thus operation of the commercial vehicle 4 in the autonomous mode 116 is permitted, or whether this is not permitted or permitted only in part. If the detected deviation A1, A2, A3 is below the predetermined tolerance value, a first fault signal SFE1 is preferably output. The fault signal SFE1 can result in the autonomous mode 116 not being permitted. It can also be provided to a further unit via the vehicle BUS 16. The vehicle BUS 16 can be used to provide the first fault signal SFE1 to a higher-level automation unit 307, for example, such as the autonomous driving unit 18, a safety driver 305 or, by radio, to an external operator 306. If further deviations A1, A2, A3 exceed a or the tolerance value, a second fault signal SFE2 or further fault signals can be output, which can likewise result in the autonomous mode 116 not being permitted. Should the autonomous mode 116 not be permitted, the braking system 1 is returned to the standby mode 100; if the autonomous mode 116 is completely facilitated, the commercial vehicle 4 is put into the autonomous mode 116. If only partial permission is provided, a driver can preferably be involved as regards how he wishes to proceed.

Also during operation in the autonomous mode 116, it may be provided that diagnostic steps 132 are carried out cyclically, some or all of which correspond to the steps described previously for the system diagnosis. It is thus possible to ensure that if one or more faults occur in the braking system 1 during autonomous operation, an appropriate error message can be output. In that case, the autonomous mode 116 can then be disabled and the braking system 1 switched to the standby mode 100. Should no fault be detected, the autonomous mode 116 can be maintained.

Figure 3:
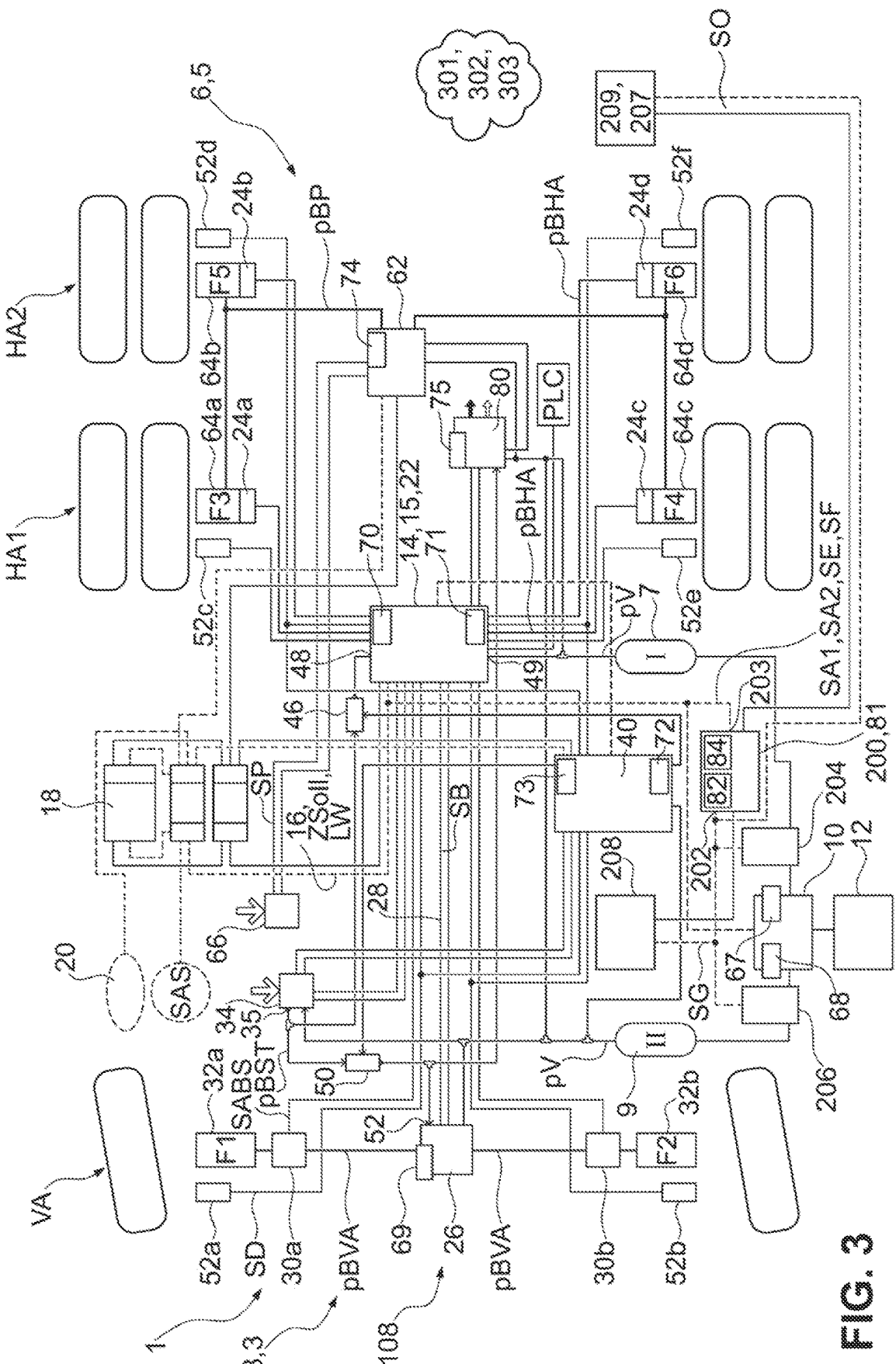
FIG. 3 shows a schematic representation of an electronically controllable pneumatic braking system according to a second embodiment.

FIG. 3 now illustrates a second embodiment of the braking system 1, which is configured to carry out the diagnostic method 2 described previously. The braking system 1 according to the second embodiment (FIG. 3) is largely based on the braking system 1 according to the first embodiment (FIG. 1). Identical and similar elements are provided with the same reference signs as in the first embodiment (FIG. 1), and in this respect reference is made to the full scope of the description above. In particular the differences are highlighted below.

A central difference is that the braking system 1 according to the second embodiment (FIG. 3) includes a health status monitoring unit 200 of the commercial vehicle 4. The health status monitoring unit 200 forms or includes the diagnostic control unit 81. This includes a voltage connection 202 that is connected to the first voltage source 17, but can also be connected to the second voltage source 19, a further voltage source or multiple voltage sources 17, 19. The health status monitoring unit 200 is connected to the vehicle BUS 16 and therefore receives all of the signals available on the vehicle BUS 16, such as in particular deceleration request signals ZSoll, steering angle signals LW, but also the wheel revolution rate signals SD, which are likewise provided on the vehicle BUS 16. Additionally, pressure signals from all of the pressure sensors 67-75 are preferably also provided on the vehicle BUS 16. According to this embodiment (FIG. 3), the health status monitoring unit 200 includes the memory unit 82 and the comparator unit 84 and is configured to carry out the diagnostic method 2 according to the disclosure. For this purpose, the health status monitoring unit 200 can also provide activity signals, specifically a first activity signal SA1 and a second activity signal SA2, on the vehicle BUS 16, in order to thus prompt the central control unit 14 to execute the first predetermined activity 104, the second predetermined activity 110 and possibly other predetermined activities. It can also provide a restriction signal SE and an enabling signal SF on the vehicle BUS 16, in order to either restrict the autonomous mode via the restriction signal SE or to enable it via the enabling signal SF.

Besides the functionalities already described for the learning mode 102 and the diagnostic mode 118, the health status monitoring unit 200 can also implement other functionalities. For this purpose, the braking system 1 according to the second embodiment (FIG. 3) is equipped with further sensors, which the sensor unit 108 may likewise include. By way of example, a first flow sensor 204 is arranged downstream of the first pressure sensor 67, that is, downstream of the air treatment unit 10, and a second flow sensor 206 is arranged downstream of the second pressure sensor 68. These form a measuring unit 204, 206 for detecting a volume flow or a mass flow. These are also used for diagnosis. If for example the first predetermined activity instigated is again the modulation of the front axle brake pressure pBVA via the front axle brake pressure valve 26, the third pressure sensor 69 may detect a constant pressure even though there is a leak downstream of the third pressure sensor 69, that is, between the front axle brake pressure valve 26 and for example the first front axle brake actuator 32a. The reason for this is that the second compressed air supply 9 continues to request compressed air, initially at supply pressure pV, and, when this falls, the air treatment unit 10 continues to request compressed air from the second compressed air supply 9. That is, on the one hand, there could be provision for the compressor 12 to be switched off during the first activity, which includes modulating the front axle brake pressure pBVA, so that compressed air cannot continue to be requested from the first and second compressed air supplies 7, 9. On the other hand, this is disadvantageous if such a diagnostic method is carried out cyclically, in particular while traveling. The flow sensors 204, 206 can be used to determine whether compressed air actually continues to be requested from the first and second compressed air supplies 7, 9. If this is the case, this suggests a leak that cannot readily be detected by a pressure sensor alone.

Additionally, the embodiment shown here (FIG. 3) also has provision for a noise sensor 208. The noise sensor 208 is supplied with voltage by the health status monitoring unit 200 and receives the noise signals SG from the noise sensor 208. These can be used to detect the noise level during the first or second predetermined activity 104, 110. The received noise signals SG are then also stored together with the first or second target system reaction 107, 113 and compared with the diagnostic system reaction 124, 126. This may also possibly allow leaks to be detected, specifically if air is escaping.

In addition, the braking system 1 according to the second embodiment (FIG. 3) has an olfactory sensing unit 209, or odor sensor. Alternatively or additionally, a gas sensor 207 may also be provided. This unit 209 may detect aromatic substances 301, messenger substances 302, or gases 303 and may provide a corresponding olfactory signal SO to the health status monitoring unit 200, which is preferably configured to evaluate it. In this way, leaks in the braking system 1 can be detected when corresponding olfactory substances 301 or messenger substances 302 are added to the compressed air.

Figure 4:
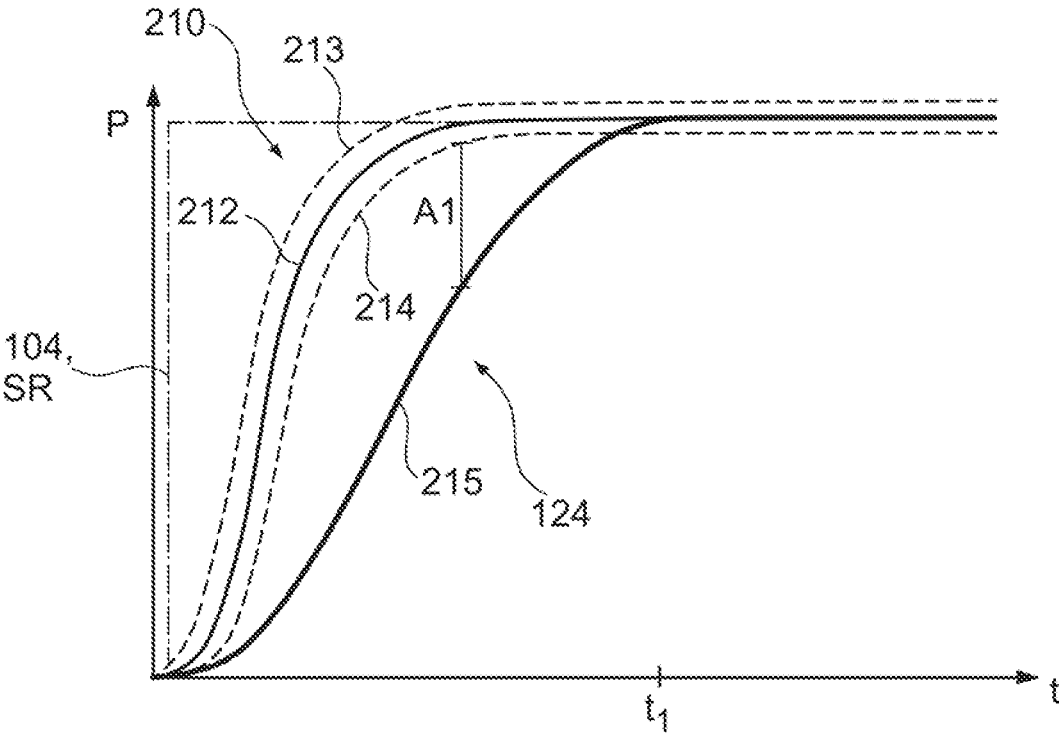
FIG. 4 shows a first graph illustrating a comparison between a target system reaction and a diagnostic system reaction; and, FIG. 5 shows a second graph illustrating a comparison between a target system reaction and a diagnostic system reaction.
Figure 5:
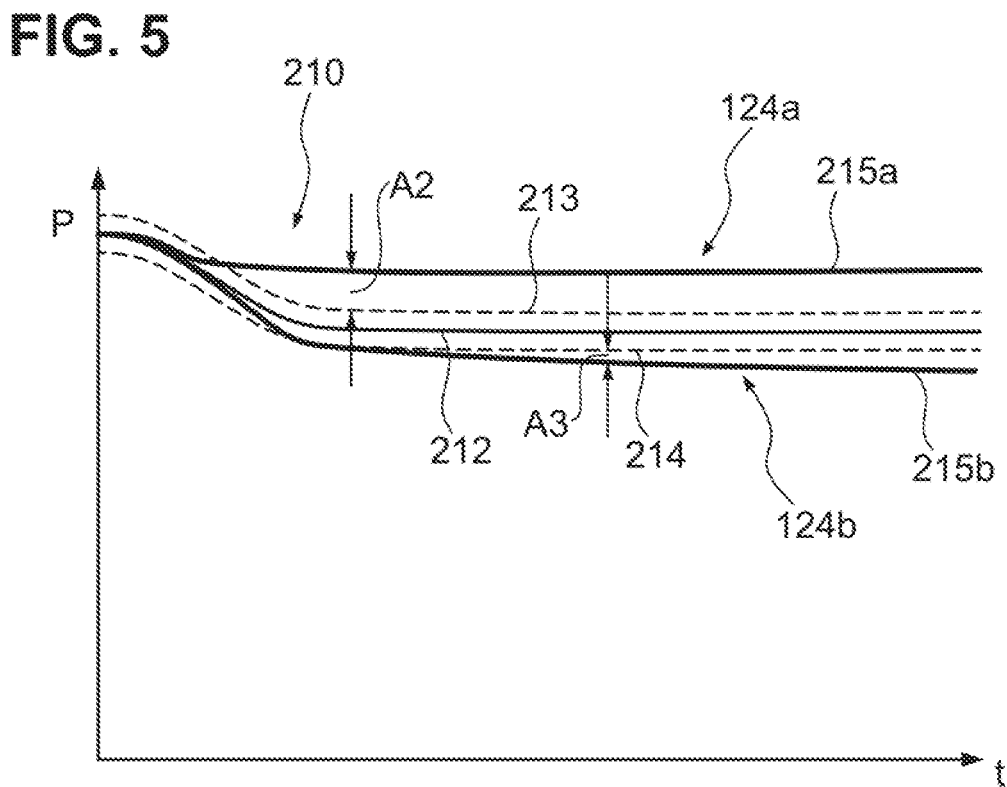

FIGS. 4 and 5 illustrate by way of example how the comparison 128 of a target system reaction and a diagnostic system reaction can be formed. Both graphs are pressure-time graphs, with the pressure plotted on the ordinate and the time plotted on the abscissa. Both diagrams of FIGS. 4 and 5 may be typical of a diagram recorded via the third pressure sensor 69. Here, a target system reaction 210 is formed by a target pressure curve 212, which is surrounded by an upper limit value 213 and a lower limit value 214. For example, the target pressure curve 212 was recorded in the learning mode 102 by the third pressure sensor 69 in response to the first activity 104, for example in the form of a step signal SR, and the upper and lower limit values 213, 214 were specified or calculated, for example by a comparator unit 84. In addition, a diagnostic system reaction 124 is shown in FIG. 4, which is shown here as a diagnostic pressure curve 215. As can be seen from FIG. 4, the pressure of the diagnostic pressure curve 215 increases much more slowly than that of the target pressure curve 212, and only actually reaches the target pressure curve 212 at time t1. There is a first deviation A1 at a certain point in time, which is variable over time. This indicates a narrowing of the target diameter in the supply path or a fault in the main valve, for example the relay valve of the front axle brake pressure valve 26. The too slowly increasing pressure curve of the diagnostic pressure curve 215 indicates that insufficient volume is provided to achieve the sharply increasing pressure curve of the target pressure curve 212.

In the second diagram in FIG. 5, a target system reaction 210 is again shown, again by a target pressure curve 212, as well as an upper limit value 213 and a lower limit value 214. The diagram in FIG. 5 shows two diagnostic system reactions 124a, 124b. For example, the diagnostic system reaction 124a may have been detected at a different time than the diagnostic system reaction 124b, for example in two consecutive cycles. The diagnostic system reaction 124a with the diagnostic pressure curve 215a shows that the air consumption is too low. This results in a second deviation, A2. A possible fault here could be in the working path of the brake cylinder, for example. The measured pressure is detected, for example, by the first or second pressure sensor 67, 68, which should detect a pressure drop when compressed air is consumed, especially during a braking action.

The diagnostic system reaction 124b with the diagnostic pressure curve 215b initially shows a curve that is very close to the target pressure curve 212, but then drops more sharply and, in particular, is not constant. It continues to fall off over time. A third deviation A3 is also variable over time. This indicates an unintentional leakage since the pressure continues to drop even in the state when the target pressure curve 212 is static.

Once the diagnostic pressure curve 215 is no longer between the upper and lower limit values 213, 214, a fault signal can be output, which can then have the consequence, for example, that the automated mode and thus the autonomous mode 116 are restricted.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

1 electronically controllable pneumatic braking system
2 diagnostic method
3 first subsystem
4 commercial vehicle
5 second subsystem
6 first brake circuit
7 first compressed air supply
8 second brake circuit
9 second compressed air supply
10 air treatment unit
12 compressor
14 central control unit
15 combined central module
16 vehicle BUS
17 first voltage source
18 autonomous driving unit
19 second voltage source
20 active steering
22 rear axle brake pressure valve
24a-24d rear axle brake actuators
26 front axle brake pressure valve
28 first brake signal line
30a, 30b ABS valves
32a, 32b front axle brake actuators
34 brake encoder
35 brake encoder pneumatic connection
36 first brake encoder line
40 secondary central control unit
42 rear axle redundancy pressure output
44 front axle redundancy pressure output
46 first shuttle valve
48 redundancy pressure connection of the central control unit
49 supply connection of the central control unit 50 second shuttle valve
52a-52f wheel revolution rate sensors
54 second BUS
60 parking braking system
62 parking brake unit
64a-64d parking brake actuators
66 parking brake switch
67 first pressure sensor
68 second pressure sensor
69 third pressure sensor
70 fourth pressure sensor
71 fifth pressure sensor
72 sixth pressure sensor
73 seventh pressure sensor
74 eighth pressure sensor
75 ninth pressure sensor
80 trailer control valve
81 diagnostic control unit
82 memory unit
84 comparator unit
100 standby of the commercial vehicle/braking system
102 learning mode
103 first system diagnostics
104 first predetermined activity
105 second system diagnostics
106 first learning system reaction
108 sensor arrangement
109 deceleration sensor
110 second predetermined activity
112 second learning system reaction
114 memories
116 autonomous mode
118 diagnostic mode
120 departure controller
122 health check
124 first diagnostic system reaction
126 second diagnostic system reaction
128 comparison
130 decision step
132 diagnostic steps (cyclic)
200 health status monitoring unit
202 voltage connection of the health status monitoring unit
203 BUS connection
204 first flow sensor
206 second flow sensor
207 gas sensor
208 noise sensor
209 olfactory sensing unit
210 target system reaction
212 target pressure curve
213 upper limit value
214 lower limit value
215 diagnostic pressure curve
301 aromatic substance
302 messenger substance
303 gas
305 safety driver
306 external operator
307 higher-level automation unit
A1 first deviation
A2 second deviation
A3 third deviation
EV electrical supply voltage level
LW steering signals
HA1 first rear axle
HA2 second rear axle P1 first parameter
pBHA rear axle brake pressure
pBP parking brake pressure
pBST brake encoder pressure
pBVA front axle brake pressure
pRHA rear axle redundancy pressure
pRVA front axle redundancy pressure
pV supply pressure
pV1 static supply pressure
pVd dynamic supply pressure
SA1 first activity signal
SA2 second activity signal
SABS ABS signals
SB brake signals
SBF foot brake signals
SD wheel revolution rate signals
SE restriction signal
SF enabling signal
SL learning signal
SO olfactory signal
SP parking brake signals
SR step signal
TU ambient temperature
VA front axle
VEL electrical power consumption
ZSoll brake request signal

The invention claimed is:

1. A diagnostic method for performing a self-diagnosis of an electronically controllable pneumatic braking system for a commercial vehicle, the diagnostic method comprising:

receiving a learning signal about the braking system;

in response to receiving the learning signal, putting the braking system into a learning mode and performing the steps:

performing a predetermined first activity of the braking system with the commercial vehicle stationary or moving;

via a first sensor arrangement, detecting a first learning system reaction of the braking system in response to executing the first activity; and, storing the detected first learning system reaction as a first target system reaction in a first memory;

performing a first system check with the steps:

carrying out the predetermined first activity of the braking system with the commercial vehicle stationary or moving;

detecting, via the first sensor arrangement, a first diagnostic system reaction of the braking system in response to the execution of the predetermined first activity;

comparing the first diagnostic system reaction in a first comparator with the previously stored first target system reaction; and, in the event of a deviation between the first target system reaction and the first diagnostic system reaction, outputting a first fault signal.

2. The diagnostic method of claim 1, further comprising: outputting the first fault signal including at least partial prevention of an automated mode of the commercial vehicle.

3. The diagnostic method of claim 1, wherein the comparison step is carried out in the first comparator taking into account at least one parameter selected from: an ambient temperature, a supply pressure, a static supply pressure before a start of the diagnostic method or a dynamic supply pressure curve during the diagnostic method, an electrical supply voltage level in the braking system or one or more parts thereof, an electrical power consumption in the braking system or one or more parts of the braking system.

4. The diagnostic method of claim 1, wherein the predetermined first activity includes a step signal to a brake force modulator.

5. The diagnostic method of claim 1, wherein the predetermined first activity includes the actuation of one or more friction brakes via modulation of a brake pressure on one or more axles of the commercial vehicle with a predetermined braking force in the moving commercial vehicle.

6. The diagnostic method of claim 5, wherein the first sensor arrangement contains a deceleration sensor for detecting a deceleration of the commercial vehicle.

7. A diagnostic method for performing a self-diagnosis of an electronically controllable pneumatic braking system for a commercial vehicle, the diagnostic method comprising:

receiving a learning signal about the braking system;

in response to receiving the learning signal, putting the braking system into a learning mode and performing the steps:

performing a predetermined first activity of the braking system with the commercial vehicle stationary or moving;

via a first sensor arrangement, detecting a first learning system reaction of the braking system in response to executing the first activity;

storing the detected first learning system reaction as the first target system reaction in a first memory; and, wherein the predetermined first activity relates only to a first subsystem of the braking system.

8. A diagnostic method for performing a self-diagnosis of an electronically controllable pneumatic braking system for a commercial vehicle, the diagnostic method comprising:

receiving a learning signal about the braking system;

in response to receiving the learning signal, putting the braking system into a learning mode and performing the steps:

performing a predetermined first activity of the braking system with the commercial vehicle stationary or moving;

via a first sensor arrangement, detecting a first learning system reaction of the braking system in response to executing the first activity;

storing the detected first learning system reaction as the first target system reaction in a first memory;

performing, in the learning mode, a predetermined second activity of the braking system with the commercial vehicle stationary or moving;

detecting, in the learning mode, via a second sensor arrangement or the first sensor arrangement a second learning system reaction of the braking system in response to said performing the second activity; and, storing, in the learning mode, the detected second learning system reaction as a second target system reaction in a second memory or the first memory.

9. The diagnostic method of claim 8, further comprising the steps:

performing a second system diagnosis with the steps:

performing the predetermined second activity of the braking system with the commercial vehicle stationary or moving;

detecting via the second sensor arrangement a second diagnostic system reaction of the braking system in response to the execution of the second activity;

comparing the second diagnostic system reaction in a second comparator or the first comparator with the previously stored second target system reaction; and, in the event of a deviation between the second target system reaction and the second diagnostic system reaction, outputting a second fault signal.

10. The diagnostic method of claim 9, wherein the predetermined second activity concerns only a second subsystem of the braking system.

11. The diagnostic method of claim 9, wherein the first fault signal or the second fault signal is output to a safety driver, an external operator and/or a higher-level automation system.

12. The diagnostic method of claim 9, wherein: in response to the first fault signal and/or the second fault signal, a driver of the commercial vehicle is asked to enable an automated mode of the commercial vehicle.

13. A diagnostic method for performing a self-diagnosis of an electronically controllable pneumatic braking system for a commercial vehicle, the diagnostic method comprising:

receiving a learning signal about the braking system;

in response to receiving the learning signal, putting the braking system into a learning mode and performing the steps:

performing a predetermined first activity of the braking system with the commercial vehicle stationary or moving;

via a first sensor arrangement, detecting a first learning system reaction of the braking system in response to executing the first activity;

storing the detected first learning system reaction as the first target system reaction in a first memory; and, wherein the first sensor arrangement contains at least one pressure sensor.

14. The diagnostic method of claim 13, wherein the first sensor arrangement contains a measuring unit for detecting a volume flow or a mass flow and/or a noise sensor.

15. The diagnostic method of claim 14, wherein the first sensor arrangement is a unit for olfactory sensing and/or a gas sensor for detecting an aromatic substance, a messenger substance and/or a gas.

16. An electronically controllable pneumatic braking system for a commercial vehicle; the electronically controllable pneumatic braking system comprising:

first and second compressed air supplies;

a first brake circuit supplied by said first compressed air supply;

a second brake circuit supplied by said second compressed air supply;

at least one front axle brake pressure valve for controlling a front axle brake pressure on a front axle of the commercial vehicle;

at least one rear axle brake pressure valve for controlling a rear axle brake pressure on at least one rear axle of the commercial vehicle;

a central control unit for controlling the braking system; and, a diagnostic control unit suitable for carrying out a diagnostic method including the steps:

receiving a learning signal about the braking system;

in response to receiving the learning signal, putting the braking system into a learning mode and performing the steps:

performing a predetermined first activity of the braking system with the commercial vehicle stationary or moving;

via a sensor arrangement, detecting a first learning system reaction of the braking system in response to executing the first activity;

storing the detected first learning system reaction as the first target system reaction in a first memory;

performing a first system check with the steps:

carrying out the predetermined first activity of the braking system with the commercial vehicle stationary or moving;

detecting, via the first sensor arrangement, a first diagnostic system reaction of the braking system in response to the execution of the predetermined first activity;

comparing the first diagnostic system reaction in a first comparator with the previously stored first target system reaction; and, in the event of a deviation between the first target system reaction and the first diagnostic system reaction, outputting a first fault signal.

17. The electronically controllable pneumatic braking system of claim 16, wherein the diagnostic control unit is part of the central control unit or is integrated therewith to form a module.

18. The electronically controllable pneumatic braking system of claim 16, wherein the diagnostic control unit is in the form of a stand-alone module having a voltage connection and a connection for a BUS system.

19. A computer program product comprising:

program code for a braking system stored on a non-transitory computer readable medium; the braking system including first and second compressed air supplies; a first brake circuit supplied by said first compressed air supply; a second brake circuit supplied by said second compressed air supply; at least one front axle brake pressure valve for controlling a front axle brake pressure on a front axle of the commercial vehicle; at least one rear axle brake pressure valve for controlling a rear axle brake pressure on at least one rear axle of a commercial vehicle; a central control unit for controlling the braking system; and, a diagnostic control unit suitable for carrying out a diagnostic method; said program code being configured, when executed by a processor, to cause the braking system to carry out the diagnostic method of the braking system including:

receiving a learning signal about the braking system;

in response to receiving the learning signal, putting the braking system into a learning mode and performing the steps:

performing a predetermined first activity of the braking system with the commercial vehicle stationary or moving;

via a sensor arrangement, detecting a first learning system reaction of the braking system in response to executing the first activity;

storing the detected first learning system reaction as the first target system reaction in a first memory;

performing a first system check with the steps:

carrying out the predetermined first activity of the braking system with the commercial vehicle stationary or moving;

detecting, via the first sensor arrangement, a first diagnostic system reaction of the braking system in response to the execution of the predetermined first activity;

comparing the first diagnostic system reaction in a first comparator with the previously stored first target system reaction; and, in the event of a deviation between the first target system reaction and the first diagnostic system reaction, outputting a first fault signal.

* * * * *